R. SHALER.
Dyeing Vat.
No. 8,249.
Patented July 22, 1851.
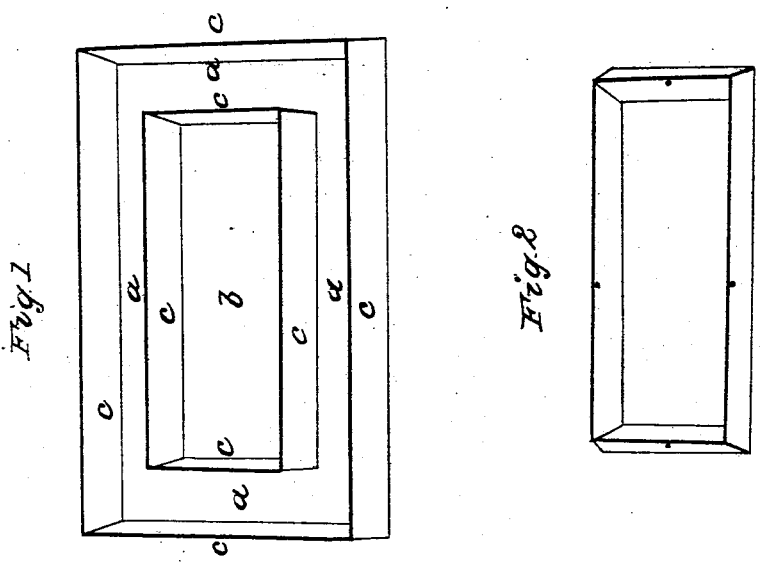

UNITED STATES PATENT OFFICE.

REUBEN SHALER, OF MADISON, CONNECTICUT.

DYEING DOOR-MATS.

Specification of Letters Patent No. 8,249, dated July 22, 1851.

*To all whom it may concern:*

Be it known that I, REUBEN SHALER, of Madison, in the county of New Haven and State of Connecticut, have invented a new and Improved Mode of Coloring Sheepskins and Lambskins for Mats and other Purposes; and I do hereby declare that the following is a full and exact description thereof, reference being had to the accompanying drawings and to the letters of reference marked thereon.

The nature of my invention consists in coloring the wool upon lamb skins with a variety of colors upon each skin or with one color on certain parts of the skin leaving the remainder white. Either the colors, or the white parts of the wool may be made to represent flowers, or any figures which the operator may design. These skins—after being colored—are used for mats, and some are matched and put together for rugs, others for journeying robes, &c.

My way of coloring the skins is described as follows: After the skin is prepared for the dye by tanning, washing, &c., as in the ordinary way I attach it to a thin board (the dimensions of which is something more than that of the skin) the skin having been trimmed to its proper shape with the wool up and the skin in contact with the board, and thus fastened, by driving tacks through and around the edge or by any other suitable device which will fasten it to the board. Then, if to color a border around the skin I turn the dye, (it having been previously made in the ordinary way) into a pan made for that purpose, and is represented by Figure 1 (see the accompanying drawings).

Fig. 1. *a, a*, is the space to contain the dye, and should be somewhat wider than the border is desired to be, and it also should extend out beyond the edge of the skin on every side, in order to color the whole of the wool on that part of the skin. This pan is made of copper or some other material on which the dye will not have any effect. The sides *c, c*, should be higher than the length of the wool on the skins. I make them six or eight inches. The part at *b*, may be a bottom or not. If the pan is to be used for coloring borders only, it would be better without the bottom in the center. Or if there be a bottom, by filling that space with dye the center part of the skin can be colored at the same time of coloring the border, and of a different color. I use the ordinary way to keep the dye hot. Now, if the space *a, a*, is filled nearly to the top with dye and that part of the wool around the edges of the skin which is desired to be colored for a border is immersed therein by waiting a suitable length of time that object is attained. But there exists a difficulty in coloring perfect lines, for if the board containing the skin is inverted and the wool is lowered into the pan some of the wool will fold or double in over the upper edges of the pan and cause an imperfect coloring, to obviate which I employ what I term a match tin, represented by Fig. 2. This is a piece of tin (other metal will answer if thin and easily bent) which is in the first place bent lengthwise in the shape of a V. When in use it is to be inverted as at Fig. 2 and matches on astride over the upper edges of the pan being carefully bent and fitted to match those parts. Fig. 2 represents one of those match tins fitted to correspond in dimensions and shape with the edges of the inward-sides of the pan Fig. 1 and will sit on over those edges. Now to use this match tin it is taken separately and placed in the wool while the skin lies the wool up, being careful to part the wool for its reception just where the inward edge of the border should be, pressing it in against the skin and fastening it there by driving in three or four tacks through into the board in such a manner as to hold it from dropping out when the board and skin are inverted and set upon the pan, an operation requiring little care to be sure that the match tin sits onto the edges of the pan and that the wool enters the dye.

To color figures of a variety of forms I make the pans to represent the various shapes I design to color, and the match tins to correspond with the shapes of the pans and follow the same mode of operation in coloring figures as in coloring borders which is above described.

What I claim as my invention and desire to secure by Letters Patent is—

The coloring of borders and figures in a variety of colors and forms upon the wool of lamb skins and sheep skins for mats, and other similar purposes by the use of pans (which are to contain the dyes) being made and shaped in the form of the borders or
5 figures, designed to be colored in combination with the matching tin or an equivalent device for parting the wool substantially in the manner and for the purpose herein set forth.

REUBEN SHALER.

Witnesses:
J. S. WILCOX,
HENRY L. SHALER.